June 19, 1951 F. W. CALDWELL 2,557,338
PITCH CONTROL MECHANISM FOR HELICOPTER ROTORS
Filed March 30, 1946 3 Sheets-Sheet 1

FRANK W. CALDWELL
INVENTOR

BY *Gifford J. Holmes*
AGENT

June 19, 1951 F. W. CALDWELL 2,557,338
PITCH CONTROL MECHANISM FOR HELICOPTER ROTORS
Filed March 30, 1946 3 Sheets-Sheet 2

FRANK W. CALDWELL
INVENTOR

BY Gifford S. Holmes
AGENT

FRANK W. CALDWELL
INVENTOR

Patented June 19, 1951

2,557,338

UNITED STATES PATENT OFFICE 2,557,338

PITCH CONTROL MECHANISM FOR HELICOPTER ROTORS

Frank W. Caldwell, West Hartford, Conn., assignor to United Aircraft Corporation, East Hartford, Conn., a corporation of Delaware Application March 30, 1946, Serial No. 658,467

5 Claims. (Cl. 170—160.2)

This invention relates to helicopters and more particularly to an improved control mechanism for helicopters whereby the rotor head thereof may be arranged more compactly than with former structures, in which the operating mechanism associated with the rotor head may be sealed in oil or the like, and in which the control of total pitch of the helicopter is effected automatically under secondary influence of the engine throttle and preset to maintain substantially a constant speed of rotation of the sustaining rotor. The mechanism is adapted for use on that type of helicopter disclosed in Patent No. 2,517,509 of I. I. Sikorsky, issued August 1, 1950.

In helicopters, it has been found that the cyclic feathering mode of control operates very well and that the rotor itself works most effectively if the rotor speed is maintained within substantially constant limits of high and low speed. Therefore, an object of this invention is to provide cyclic pitch mechanism together with hydraulically actuated total pitch mechanism connected through the drive gearing for the sustaining rotor to constant speed responsive means for maintaining the speed of rotation of the sustaining rotor within predetermined limits when power is applied to the rotor, and also when the rotor is turned by relative airflow, or autorotating.

A further object of this invention is to provide a rotor head structure associated with the rotor drive mechanism and with the rotor blades to render the same free from danger of injury of exposed parts and to keep the mechanism free from dirt and unauthorized tampering with vital parts of the operating structure.

In carrying out this invention, I have provided a rotor head turned by improved reduction gearing, which head encloses the rotating parts of the control mechanism. A compact servo-mechanism responsive automatically to rotor head speed controls the angle of incidence of the rotor blades by a floating type of control supplied from constantly operated fluid pressure generating means. The rotor head may be of very compact structure and be sealed within a casing having low aerodynamic drag characteristics and contain an amount of lubricant sufficient to maintain all operating parts within the housing lubricated, and also supply liquid to the dampers associated with the rotor blades which inhibit hunting as the blades move in the supporting air, and are subjected to differential flight forces between the advancing and retreating blades when in translation.

One device embodying the features of this invention is shown somewhat diagrammatically for purposes of clarity in the accompanying drawings, in which.

Figure 1:
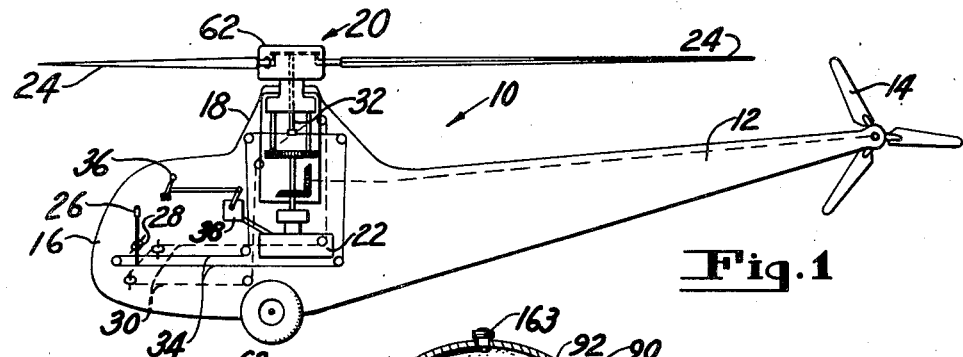
Fig. 1 is a diagrammatic side view of a helicopter, only the outlines of which are shown with the operating mechanism therein shown diagrammatically.

In Fig. 1, a helicopter 10 comprises a body having a tail portion 12 supporting a torque counteracting rotor 14, a forward occupant's portion 16 and a pylon 18 supporting a rotor head generally indicated by the reference character 20 that is turned by an engine 22 through gearing to be described below. The rotor head 20 supports rotor blades 24 of which there may be one or more, and in the specific embodiment hereof three rotor blades substantially equally spaced apart 120 degrees around the centerline of the rotor drive shaft.

The rotor blades 24 are adapted to be cyclically feathered to provide translation and stability to the craft and are controlled by a joy stick 26 which is carried upon a universal pivot 28 and can move cables 30 or the like to tilt a control arm 32 to provide transverse tilting of the cyclic pitch mechanism, to be described more fully below; and more cables 34 or the like to move the arm 32 at right angles to the above movement to provide fore and aft cyclic pitch functions of the rotor blades. A throttle 36 is connected with a carburetor 38 for providing fuel to the engine 22 to change its torque output capacity and thus the lift of the blades turned thereby.

Figure 2:
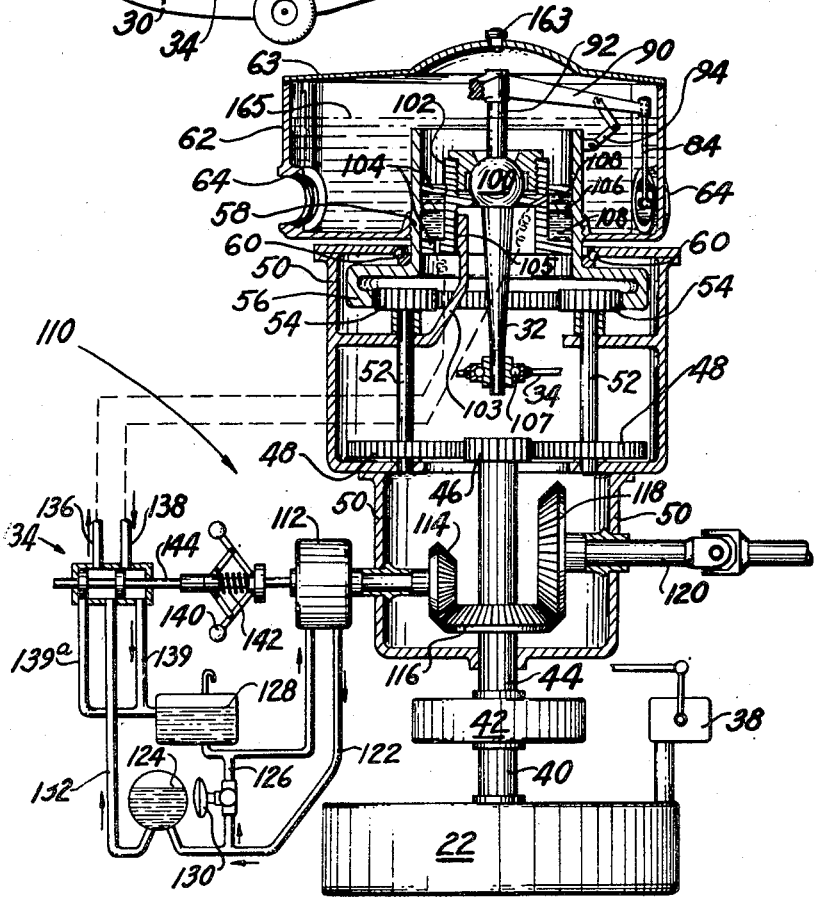
Fig. 2 is an enlarged diagrammatic view of an operating mechanism for the rotor blades of a helicopter.

As shown in Fig. 2, the engine 22 connects with a shaft 40 which operates a combined centrifugal and overrunning clutch 42 which can turn an output shaft 44 having a pinion 46 at its uppermost end. The pinion 46 turns a pair of follower gears 48 which are journaled in the gear housing or framing members 50 for the helicopter to turn shafts 52 turning reduction gear pinions 54. The pinions 54 turn a ring gear 56 which is connected to a rotatable upstanding sleeve 58 mounted upon thrust bearings 60 carried by the framing members 50 at their upper ends. A housing 62 is secured to the sleeve 58 and contains journals 64 into which the rotor blades set and are turned with the housing 62.

Figure 3:
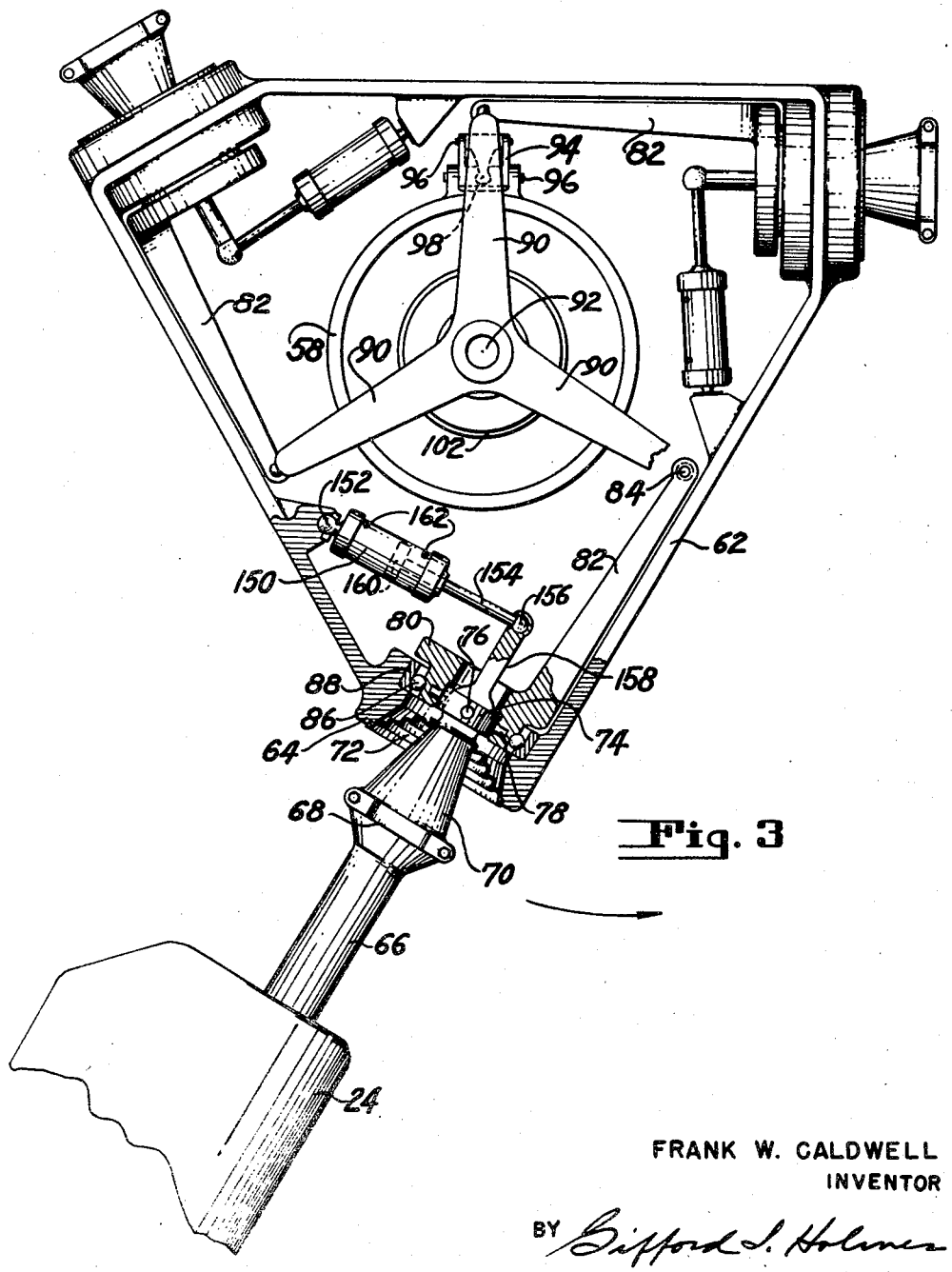
Fig. 3 is a still further enlarged diagrammatic plan view of the rotor head with the cover removed to show the internal working parts.

In Fig. 3, the connection of one blade in its bearing 64 is shown. The rotor blade 24 is provided with a spar 66 which has a coupling 68 connecting it with a stub spar 70. The stub spar 70 has a flexible seal-off diaphragm 72 connected between it and the journal 64 so that oil within the housing 62 will not leak out. A universal joint 74 has a generally vertically arranged drag pin 76 for the blade 24 and a generally horizontal flapping pin 78, the two of which permit the blade to move back and forth and up and down as it rotates. The pins 78 form trunnions in a ring 80 which has an arm 82 connected by a universal pivot to a push-pull rod 84 that is movable up and down to change the pitch of the rotor blade. The ring 80 is mounted by radial-thrust ball bearings 86 upon a race 88 secured in the journal 64. Up and down movements of the rod 84 will cause the arm 82 to move up and down in an arc to rotate the ring 80 and hence change the angle of incidence of the blade 24. When all of the arms 82 are raised simultaneously, the pitch of the blades will be increased. When the arms 82 are raised and lowered once in each revolution, the lift of the blade will vary cyclically in substantially a sinusoidal manner to cause the rotor to tilt and provide a transverse or propelling component of lift. With this invention, such action is obtained by tilting the cyclic pitch arm 32 by means of the joystick 26.

Referring again to Fig. 2, the rod 84, only one of which is shown in elevation for purposes of clarity, connects with a spider arm 90 that is secured to an upright extension arm 92 of the arm 32. The spider arm 90 is secured to the sleeve 58 by a scissors device 94 connected by transverse pivots 96 and a ball joint 98 (Fig. 3) to the arms 90, and thus is rotatable with the sleeve 58. The arms 32 and 92 connect with a spherical segment 100 which is secured by liquid sealing bearings in a centrally hollow piston 102 having operating flanges 104 extending therearound that cooperate with a stationary flange 106 carried by the sleeve 58 to form expansible and contractible chambers 108 which upon expanding and contracting move the piston 102 up and down to move spider arms 90 to change the total pitch of the rotor blades in the manner described above. The piston 102 is held against rotation by an extension arm 103 of the frame 50, which arm has a splined upright end 105 mating with splines in the piston 102. Cyclic pitch of the rotor blades is obtained by moving the lower end of the arm 32 in any direction in azimuth to rock the ball within its spherical seat in the piston and the arms 90 to cause the rotor blade to increase its pitch through one half of a blade's revolution and decrease the pitch on the other half, to obtain translational control such as described more fully in the patent of Igor I. Sikorsky mentioned above. Because the arm 32 rotates, a bearing 107 is provided for connection with the cables 30 and 34.

In order to maintain the speed of the rotor blades within substantially constant limits, and to relieve the operator of the helicopter from the requirement for attending to rotor speed, I have provided automatic means generally indicated at 110 for maintaining the pitch of the blades at such angles as to provide substantially constant rotor speed under both power-on and power-off operation. The mechanism 110 supplies liquid under pressure to one or the other of the chambers 108 to reduce or increase the total pitch of the changes in rotor blades in response to rotor speed.

A pump 112 is turned at all times by a gear 114 turned by a gear 116 secured to the shaft 44, which gear 116 may also turn a gear 118 for the torque compensation rotor drive shaft 120. The pump 112 supplies oil under pressure to a pipe 122 which can pass oil into an accumulator 124 or through a pipe 126 into a sump 128 under control of a pressure relief valve 130 responsive to pressure in the accumulator 124 and pipe 122. Oil from the accumulator 124 can pass into a pipe 132, through a control valve 134 and selectively into the left hand pipe 136 or a right hand pipe 138 supplying the lower and upper chambers 108 respectively in the rotor head. In the position shown, oil will flow from the pipe 132 into the pipe 136 and into the lower chamber 108 to supply pressure to the lower flange 104 of the piston 102 to move the spider arms 90 and the control rods 84 downwardly, to thus reduce the angle of incidence of the blades 24. Oil from the upper chamber 108 will flow through the pipe 138 through pipe 139 to the sump 128.

To cause the above action, a governor 140 biased by a compression spring 142 will have moved a valve rod 144 to the left. Such contraction of the governor 140 indicates a reduction in speed of the rotor, and hence a reduced pitch will be required to reduce the drag of the rotor whereby the engine can speed the rotor up. Upon speeding up, the governor weights will swing apart to move the shaft 144 to the right to shut off the supply pipes 136 and 138 to maintain the correct setting. Due to governor inertia, the control may overshoot slightly to reverse the above-traced action slightly to substantially offset and counterbalance the static lag of the governor upon the occurrence of the fall in rotor speed. This characteristic can be controlled by suitable restriction of the liquid piping.

With both pipes 136 and 138 closed, the pressure relief valve 130 opens so that the pump 112 will not be overloaded. As the weights 140 move apart, due to increase of the rotor speed, the pipe 138 will receive high pressure fluid to build up pressure in the upper chamber 108 to raise the spider arms 90 to increase the pitch of the rotor blades. At such time, the fluid in the lower chamber will drain out of the pipe 136 through the pipe 139a to the sump 128.

Referring again to Fig. 3, provision is made within the housing 62 for restraining hunting movements of the rotor blades 24. A hydraulic damper 150 has its casing secured by a ball joint 152 to the housing 62 and has a piston rod 154 secured by a ball joint 156 to a stub spar extension 158. As the blade oscillates back and forth, liquid at one or the other side of a piston 160 will be urged out of a restricting orifice 162 and into the interior of the housing 62. At the same time, oil will be introduced to the other side of the piston 160 through the other orifice 162. With such structure, no reservoir or connections are required for supplying oil to the dampers but the oil contained within the housing 62 may also serve as the damping fluid. In order to compensate for pressure changes within the housing 62 due to temperature or level of oil, a screened air vent 163 is provided in the cover 63 for the casing 62. As best shown in Fig. 2, the oil within the housing may be maintained at a suitable level as indicated at 165 to normally cover all operating parts when the rotor is in operation and centrifugal force acting on the oil will move it outwardly and upwardly towards the operating parts, most of which are located adjacent the wall of the casing 62, and towards the corners of the generally triangularly shaped housing. With such an arrangement and by properly designing the parts to occupy as small a space as possible, while providing proper clearance, the amount of oil required will be very small but it will function to maintain all parts oiled and keep them free from oxidation, and supply oil for the dampers 150.

In the operating of the device shown herein, it is only necessary for the operator to increase the throttle opening to increase the power supplied by the engine to obtain a given lift from the rotor blades 24. Thus, to take off, the throttle 36 is moved toward throttle-open position and the helicopter will rise into the air. The operator will attend to control of the joy stick 26 for directional movements of the helicopter and to the controls, not shown, for the torque compensating rotor 14, which controls may also be automatic in nature if desired, as disclosed in the co-pending application of Harry T. Jensen, U. S. application Serial No. 701,605, filed October 10, 1946. To descend, the throttle setting may be decreased and the automatic control mechanism 110 will maintain a substantially constant speed for the rotor blades 24 during descent to obviate the danger of stalling the blades.

Figure 4:
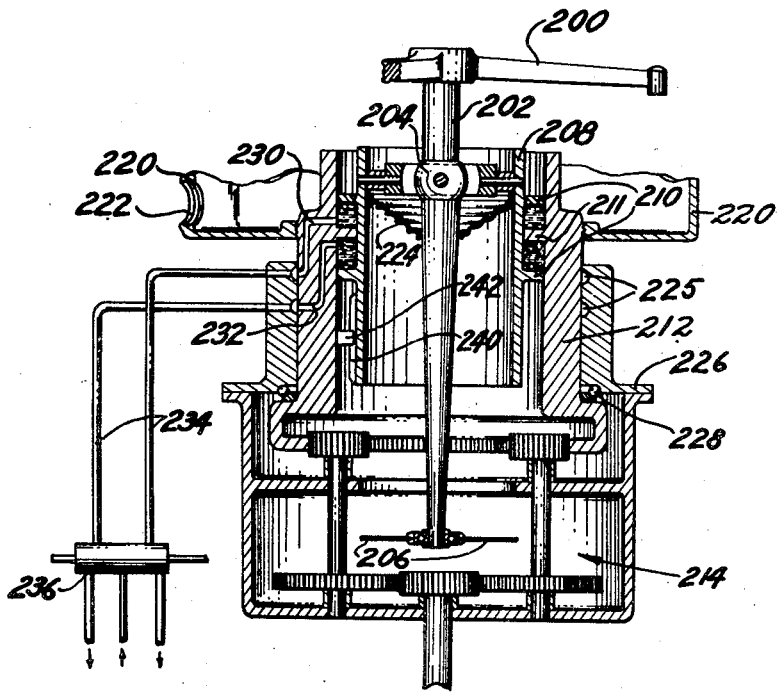
Fig. 4 is a view similar to Fig. 2, but of a modified structure.

Referring now to Fig. 4, which shows a modified form of the mechanism for controlling the total and cyclic pitch, and incorporating a modified construction in the slidable sleeve member in the head, a control spider 200 may be substantially the same as that described above in connection with Fig. 2 and connects with a rod 202 mounted in universal 204. The lower end of the rod 202 connects through a ball bearing with control cables 206. The universal 204 is mounted in a movable sleeve, or piston, 208 which mounts outwardly extending flanges 210 cooperable with a flange 211 of a drive sleeve 212. The sleeve 212 is connected to gearing 214 which may be identical to the gearing described in connection with Fig. 2.

A housing 220 is connected to the sleeve 212 and is turned thereby. Connections for blades may be made at 222 in substantially the same manner as described in connection with Fig. 2. An oil seal 224 connects with the inner wall of the sleeve 208 and to the rod 202 so that oil will be sealed within the housing 220, and lubricate the universal 204.

The sleeve 208 is moved up and down by fluid pressure in substantially the same manner as in the modification described above. However, the fluid connections to the chambers from the hydraulic motor are modified and includes a pair of supply grooves 225 in a mounting member 226 for supporting the entire body of the helicopter on bearings 228. Ports 230 and 232 communicate with the upper and lower grooves 225 respectively and with supply and vent pipes 234. A control valve 236 may be moved by a governor in substantially the same manner as described in Fig. 2 to vary the pressure of liquid in the lines 234 to supply or vent either the upper or lower fluid chambers around the sleeve 208. The operation of this structure will be identical to that described in connection with Fig. 2 except that the universal joint 204 obviates the need of a scissors for causing the spider 200 to turn with the housing 220. In the present modification, such turning is accomplished by means of a spline 240 upon the sleeve 208 which cooperates with teeth 242 upon the sleeve 212, which causes the sleeves 208 and 212 to rotate together, but permits up and down relative movement therebetween.

While I have shown and described one preferred embodiment of this invention, obviously modifications pertaining to the details of construction will occur to those skilled in the art. For this reason, I wish not to be limited in my invention only to that form shown and described but by the spirit of the following claims.

I claim:

1. In a helicopter, a drive shaft, a rotor head driven by said shaft including a housing adapted to contain fluid, a plurality of controllable pitch blades mounted on said rotor head and having their root ends extended into said housing, means for simultaneously and equally varying the pitch of all of said blades including cooperating cylinder and piston elements carried by said rotor head within said housing, said cylinder element having an inwardly directed annular flange and said piston element having outwardly directed flanges on opposite sides of said cylinder flange cooperating with the latter and said cylinder element to form expansible fluid chambers and said piston having a tiltable member carried thereby having operative connections to said blades, said operative connections being disposed in said fluid containing housing, means for supplying fluid under pressure to said chambers to move said piston and effect variation in the pitch of all of said blades, and means for tilting said piston carried tiltable member to effect cyclic pitch control of said blades.

2. In a helicopter, a drive shaft, a rotor head driven by said shaft, a plurality of controllable pitch blades mounted on said rotor head, fluid pressure responsive means on said rotor head for controlling the pitch of said blades including a cylindrical sleeve which is coaxial with the axis of rotation of said rotor head and a cooperating piston element reciprocable in said sleeve, said sleeve and said piston element having opposed surfaces defining expansible fluid chambers, a tiltable member having a universal mounting on said piston element, means for operatively connecting said tiltable member with said blades, means for holding said piston element against rotation, a source of fluid pressure, and fluid conducting means including passages in said piston element for supplying fluid to said chambers.

3. In a helicopter, a drive shaft, a rotor head driven by said shaft including a cylinder coaxial with the axis of rotation of said rotor head, a plurality of controllable pitch blades mounted on said rotor head, a piston reciprocable in said cylinder, means carried by said cylinder and piston forming two expansible fluid chambers, a tiltable member rotatably mounted on said piston having operative connections with said blades, means for holding said piston against rotation, means for connecting said tiltable member to said cylinder for rotation therewith, a source of fluid pressure, fluid conducting means of supplying fluid from said source to said chambers through passages in said piston to effect simultaneous and equal pitch changes in all of said blades, and means having operative connections to said tiltable member for effecting cyclic pitch changes of said blades.

4. A structure as claimed in claim 1 having a stationary casing surrounding said cylinder element, passage means in said cylinder element and casing for supplying fluid under pressure to said chambers including passages in said casing and registering passages in said cylinder element communicating with the respective chambers, and governor means for controlling the flow of fluid to said chambers in response to speed changes in said drive shaft.

5. A structure as claimed in claim 1 having a stationary casing surrounding said cylinder element, a source of fluid pressure, fluid conducting means for supplying fluid from said source to said chambers including annular passages in said stationary casing and registering passages in said cylinder element, and governor means responsive to changes in speed of said drive shaft for controlling the supply of fluid to said chambers.

FRANK W. CALDWELL.

REFERENCES CITED

The following references are of record in the file of this patent:

UNITED STATES PATENTS

| Number | Name | Date |
|---|---|---|
| 1,550,550 | McCauley | Aug. 18, 1925 |
| 1,879,935 | Hill | Sept. 27, 1932 |
| 1,887,045 | Schwarz | Nov. 8, 1932 |
| 1,948,457 | Larsen | Feb. 20, 1934 |
| 2,017,505 | Meon | Oct. 15, 1935 |
| 2,030,078 | Vaughn | Feb. 11, 1936 |
| 2,080,522 | Wilford | May 18, 1937 |
| 2,094,149 | Gaba | Sept. 28, 1937 |
| 2,113,478 | Gobereau | Apr. 5, 1938 |
| 2,163,893 | Schairer | June 27, 1939 |
| 2,216,416 | Mader | Oct. 1, 1940 |
| 2,271,149 | Di Cesare | Jan. 27, 1942 |
| 2,308,228 | Matteucci | Jan. 12, 1943 |
| 2,343,416 | Keller | Mar. 7, 1944 |
| 2,350,126 | Pitcairn | May 30, 1944 |
| 2,352,342 | Pitcairn | June 27, 1944 |
| 2,364,672 | Stevenson | Dec. 12, 1944 |
| 2,379,301 | Hoover | June 26, 1945 |
| 2,394,846 | Cox | Feb. 12, 1946 |
| 2,410,545 | Main | Nov. 5, 1946 |
| 2,425,651 | Stalker | Aug. 12, 1947 |
| 2,432,775 | Lennon | Dec. 16, 1947 |
| 2,435,080 | Hoover | Jan. 27, 1948 |
| 2,465,681 | Gluhareff | Mar. 29, 1949 |

OTHER REFERENCES

Prause et al.: A. P. C. 362,280, published May 18, 1943.